United States Patent
Ledermann

(10) Patent No.: US 10,697,930 B2
(45) Date of Patent: Jun. 30, 2020

(54) METHOD FOR DIAGNOSING A LAMBDA SENSOR DURING ONGOING OPERATION

(71) Applicant: Robert Bosch GmbH, Stuttgart (DE)

(72) Inventor: Bernhard Ledermann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 266 days.

(21) Appl. No.: 15/034,167

(22) PCT Filed: Nov. 12, 2014

(86) PCT No.: PCT/EP2014/074364
§ 371 (c)(1),
(2) Date: May 3, 2016

(87) PCT Pub. No.: WO2015/071302
PCT Pub. Date: May 21, 2015

(65) Prior Publication Data
US 2016/0252479 A1 Sep. 1, 2016

(30) Foreign Application Priority Data

Nov. 13, 2013 (DE) .................. 10 2013 223 049

(51) Int. Cl.
*G01N 27/417* (2006.01)
*F02D 41/14* (2006.01)

(52) U.S. Cl.
CPC ..... *G01N 27/4175* (2013.01); *F02D 41/1474* (2013.01); *F02D 41/1495* (2013.01); *F02D 41/1454* (2013.01)

(58) Field of Classification Search
CPC .......... G01N 27/4175; G01N 33/0006; G01N 33/007; F02D 41/1474; F02D 41/1495; F02D 41/1454
(Continued)

(56) References Cited

U.S. PATENT DOCUMENTS

| 4,819,602 A * | 4/1989 | Mieno ................. F02D 41/1495 123/688 |
| 2005/0173263 A1* | 8/2005 | Bowden ............. G01N 27/4175 205/775 |

(Continued)

FOREIGN PATENT DOCUMENTS

| CN | 102472185 A | 5/2012 |
| DE | 10 2011 089383 | 6/2013 |

(Continued)

OTHER PUBLICATIONS

International Search Report dated Feb. 5, 2015 of the corresponding International Application PCT/EP2014/074364 filed Nov. 12, 2014.

*Primary Examiner* — Nimeshkumar D Patel
*Assistant Examiner* — Nashmiya S Fayyaz
(74) *Attorney, Agent, or Firm* — Norton Rose Fulbright US LLP; Gerard Messina

(57) ABSTRACT

A method for diagnosing a lambda sensor during ongoing operation. It includes energizing the lambda sensor using a pump current pulse additive to a pump current and a pump current counter pulse additive to the pump current and ascertaining a malfunction of the lambda sensor from voltages, which are measured at a pump cell and/or a Nernst cell of the lambda sensor during the energization by the pulses.

12 Claims, 1 Drawing Sheet

(58) Field of Classification Search
USPC .......................................................... 73/1.06
See application file for complete search history.

(56) References Cited

U.S. PATENT DOCUMENTS

| | | | | |
|---|---|---|---|---|
| 2010/0000864 A1* | 1/2010 | Diehl | ................... | G01N 27/419 |
| | | | | 204/425 |
| 2010/0073017 A1* | 3/2010 | Bevot | ................ | G01N 27/4065 |
| | | | | 324/703 |
| 2012/0293183 A1* | 11/2012 | Ledermann | ............. | F02B 39/16 |
| | | | | 324/543 |
| 2013/0186169 A1* | 7/2013 | Bevot | ................ | G01N 27/4065 |
| | | | | 73/1.06 |
| 2013/0199283 A1* | 8/2013 | Chen | ..................... | F02D 41/008 |
| | | | | 73/114.73 |
| 2015/0047411 A1* | 2/2015 | Ledermann | ......... | F02D 41/1456 |
| | | | | 73/1.06 |

FOREIGN PATENT DOCUMENTS

| | | | |
|---|---|---|---|
| DE | 10206110014 | * | 11/2017 |
| EP | 1494025 A1 | | 1/2005 |
| GB | 2188436 A | | 9/1987 |
| JP | 2001355506 A | | 12/2001 |
| JP | 2006267126 A | | 10/2006 |
| WO | WO 2004/053475 | | 6/2004 |
| WO | WO 2014/063903 | | 5/2014 |

* cited by examiner

METHOD FOR DIAGNOSING A LAMBDA SENSOR DURING ONGOING OPERATION

FIELD

The present invention relates to a method for diagnosing a lambda sensor during ongoing operation. Furthermore, the present invention relates to a computer program which executes all steps of the method according to the present invention when it runs on a computer or control unit, and a data carrier, which stores this computer program. Finally, the present invention relates to a control unit, which is designed to carry out the method according to the present invention.

BACKGROUND INFORMATION

Legal regulations stipulate the monitoring of the composition of the exhaust gas of internal combustion engines to maintain limiting values. For this purpose, undesirable substances, such as nitrogen oxides and carbon monoxide, in the exhaust gas are converted into substances considered to be noncritical, such as water vapor, carbon dioxide, and nitrogen, with the aid of controlled three-way catalytic converters. This conversion presumes that the fuel-air mixture supplied to the internal combustion engine is in a certain composition range close to a stoichiometric composition. It is designated by parameter $\lambda=1$. The composition of the fuel-air mixture is monitored using exhaust gas sensors provided in the exhaust gas duct of the internal combustion engine, for example, in the form of broadband lambda sensors, which determine the oxygen partial pressure.

The correct function of the exhaust gas sensors and in particular also their aging resistance is strongly dependent on their electronic circuit. The lambda regulation has particular significance in this case, the exhaust gas sensors available on the market being able to have different characteristics with respect to the dynamic response and the dead times. To be able to ensure a stable regulation, for example, lambda controllers installed in engine control units have to be supplemented using additional electronic circuits, if exhaust gas sensors, in particular from different suppliers, are installed. For this purpose, for example, a lambda controller known as a "CJ135 Lambda Probe Interface IC" is used, which contains a PID controller.

Calibration and diagnostic measurements usually result in short-term signal invalidity during the operation and the evaluation of lambda sensors, since the control system is typically brought out of equilibrium. Depending on the length of the signal invalidity, violations of the law may occur with respect to monitoring and emissions. To avoid this, some lambda sensor diagnostic measurements are placed in the coasting or start-stop phases of the internal combustion engine, which is often not desired by the automobile manufacturers. The CJ135 lambda controller intrinsically already offers the capability of having calibration measurements run in parallel to the pump current operation, without influencing it. However, such diagnostic measurements usually still result in temporary invalidity of the signal when they are carried out in parallel with the pump current operation.

SUMMARY

A method according to an example embodiment of the present invention for diagnosing a lambda sensor during ongoing operation includes the energization of the lambda sensor using a pump current pulse additive to a pump current and a pump current counter pulse additive to the pump current and the ascertainment of a malfunction of the lambda sensor from voltages, which are measured on a pump cell and/or on a Nernst cell during the energization by pulses. "Additive" is understood according to the present invention to mean that the value of a current pulse is added to the pump current provided for the ongoing operation of the lambda sensor. This added value may be negative, so that a subtraction of its absolute value takes place. The pump current counter pulse is understood according to the present invention as a current pulse, the sign of which differs from that of the pump current pulse. It is, thus, possible that the pump current pulse is positive and the pump current counter pulse is negative, or that the pump current pulse is negative and the pump current counter pulse is positive. This method enables a diagnostic measurement to be carried out, during which the pump current operation is only interrupted for a very short time. The malfunction which may be ascertained with the aid of the method according to the present invention may be, for example, an excessively weak air reference due to mechanical damage, for example, on the reference volume of the lambda sensor. Furthermore, a malfunction as a result of an impairment of the capacitors on the pump cell and the Nernst cell of the lambda sensor may be ascertained, which results in a misinterpretation of the pump current within the meaning of the Nernst principle.

It is preferred that the pump current pulse and the pump current counter pulse be selected in such a way that changes of the Nernst voltage of the lambda sensor are neutralized by the pump current pulse, the pump current counter pulse, and diffusion effects and flow effects occurring between these pulses. The control system is thus immediately in an engaged state again after ending of the pump current counter pulse.

It is particularly preferred that the delta amplitude of the pump current counter pulse be adjusted over multiple diagnosis cycles in such a way that changes of the Nernst voltage of the lambda sensor are neutralized by the pump current pulse, the pump current counter pulse, and diffusion effects and flow effects occurring between these pulses. A delta amplitude is understood according to the present invention as the amplitude difference between the pump current pulse and the pump current counter pulse and the pump current. At the end of the diagnosis, no influence whatsoever of the following pump current should be present for typical lambda sensors. For lambda sensors having a behavior at the limits of the specific manufacturing variation, this adjustment within a few cycles of the diagnosis enables it to ensure that no influence of the following pump current also takes place for these lambda sensors. For the adjustment, in particular a target state is defined, which may include, for example, that the Nernst voltage of the lambda sensor corresponds to its control voltage, or the pump current of the lambda sensor after the diagnosis corresponds to the pump current of the lambda sensor prior to the diagnosis.

It is very particularly preferred that at least one diffusion characteristic and/or at least one flow characteristic of a diffusion barrier of the lambda sensor be ascertained from the ratio between the delta amplitude of the pump current pulse and the delta amplitude of the pump current counter pulse. In this way, the adjustment of the delta amplitude of the pump current counter pulse may be used to determine present parameters of the lambda sensor.

The duration of the pump current pulse and the duration of the pump current counter pulse may generally be arbitrary in the method according to the present invention. However, it is preferred that the duration of the pump current pulse essentially correspond to the duration of the pump current counter pulse. "Essentially correspond" is understood in particular to mean that the duration of the pump current pulse corresponds to 90% to 110% of the duration of the pump current counter pulse. Furthermore, it is preferred that the duration of the pump current pulse and the duration of the pump current counter pulse each be at least 20 msec. Furthermore, it is preferred that the duration of the pump current pulse and the duration of the pump current counter pulse each be at most 250 msec.

Generally, the delta amplitude of the pump current pulse and the delta amplitude of the pump current counter pulse may assume arbitrary values in the method according to the present invention. However, it is preferred that the delta amplitude of the pump current pulse be greater than the delta amplitude of the pump current counter pulse. This is advantageous compensating diffusion and flow effects occurring between the pump current pulse and the pump current counter pulse.

The delta amplitude of the pump current counter pulse is particularly preferably selected as a function of at least one diffusion characteristic and/or at least one flow characteristic of a diffusion barrier of the lambda sensor. These characteristics may be determined once for standard lambda sensors from measurements or calculations using flow and diffusion equations. For sensors which deviate therefrom as a result of manufacturing, the delta amplitude of the pump current counter pulse may be adjusted as described above over multiple diagnosis cycles.

It is possible in the method according to the present invention to provide further pump current intermediate pulses between the pump current pulse and the pump current counter pulse.

The computer program according to the present invention enables the method according to the present invention to be implemented in an existing control unit, without having to carry out structural modifications thereon. For this purpose, it executes all steps of the method according to the present invention when it runs on a computer or control unit. The data carrier according to the present invention stores the computer program according to the present invention. By uploading the computer program according to the present invention onto a control unit, the control unit according to the present invention is obtained, which is designed to diagnose a lambda sensor during ongoing operation with the aid of the method according to the present invention. The control unit preferably includes a CJ135 Lambda Probe Interface IC as the lambda controller.

BRIEF DESCRIPTION OF THE DRAWINGS

One exemplary embodiment of the present invention is shown in the figures and explained in greater detail below.

DETAILED DESCRIPTION OF EXAMPLE EMBODIMENTS

Figure 1:
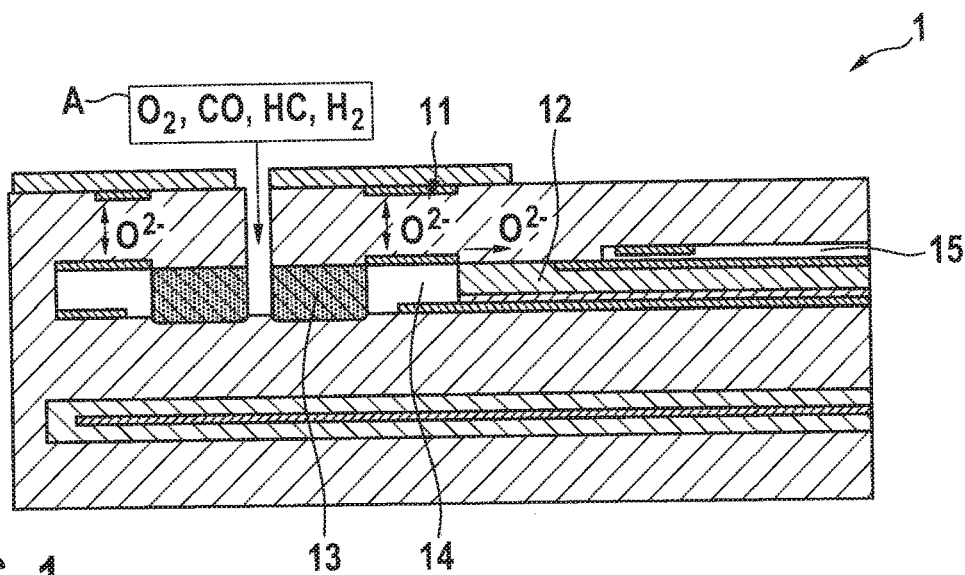
FIG. 1 schematically shows a detail of a broadband lambda sensor, which may be diagnosed during ongoing operation with the aid of a method according to one specific embodiment of the present invention.

A detail of a conventional broadband lambda sensor 1 is shown in FIG. 1. It includes a pump cell 11, a Nernst cell 12, a diffusion barrier 13, a lambda-1 cavity 14, and an air reference 15. Nernst cell 12 is controlled, in a conventional operating strategy of lambda sensor 1 using a reference pump current, to a Nernst voltage Un of 450 mV, so that lambda-1 cavity 14 inside lambda sensor 1 is considered to be essentially oxygen-free. This is carried out by applying a pump current to pump cell 11, which connects lambda-1 cavity 14 to exhaust gas A of an internal combustion engine. Exhaust gas A is also connected to lambda-1 cavity 14 via diffusion barrier 13, through which oxygen may enter Nernst cell 12 from exhaust gas A, from which it is pumped back into the exhaust gas, in principle via pump cell 11. The required pump current is determined via a Nernst voltage controller and is a measure of the oxygen concentration or the lambda value of exhaust gas A.

Figure 2:
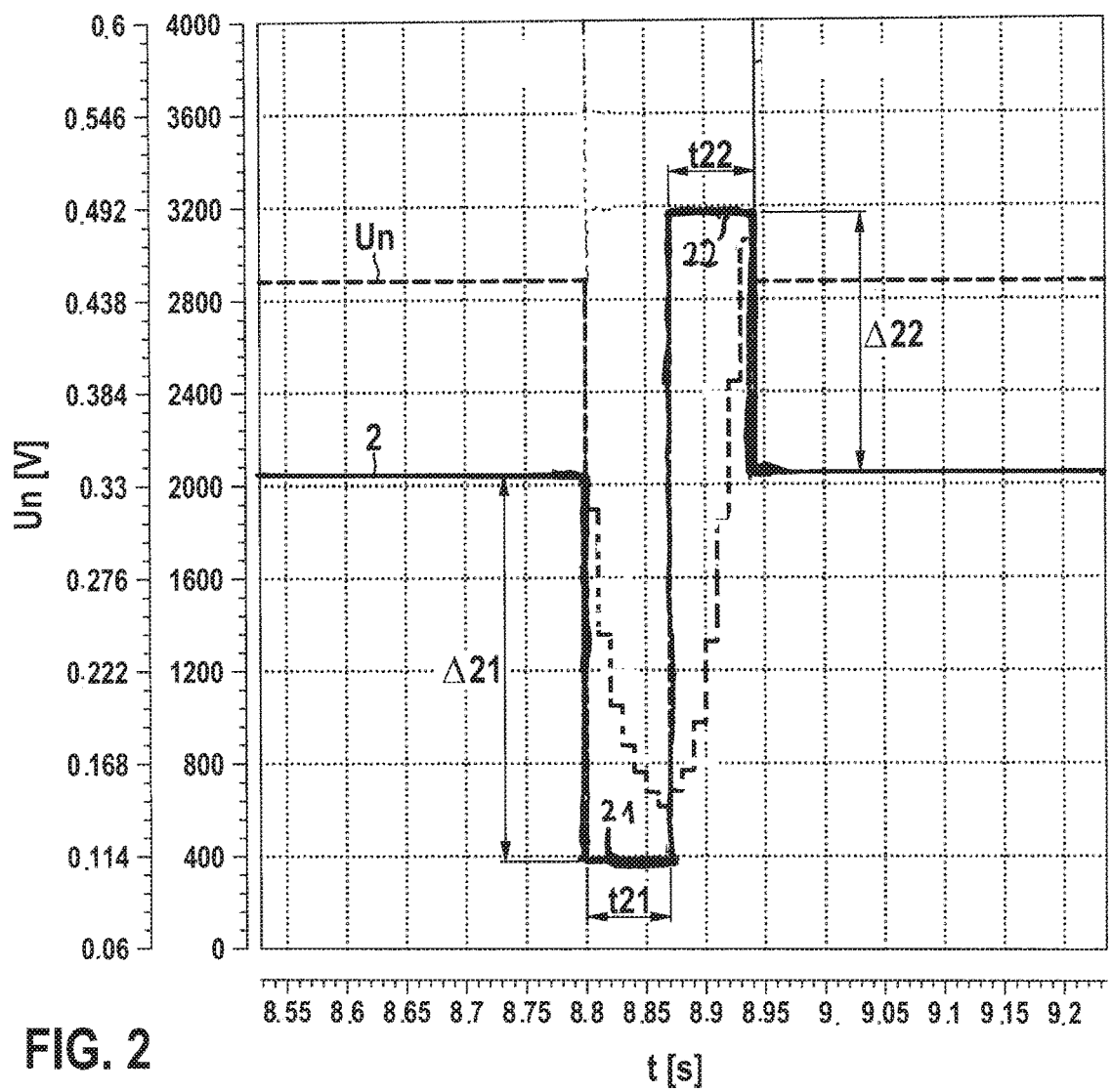
FIG. 2 shows a diagram of the time curve of the Nernst voltage of a lambda sensor and a pump current pulse and a pump current counter pulse during a diagnosis of a lambda sensor with the aid of a method according to one specific embodiment of the present invention.

In one exemplary embodiment of the method according to the present invention, such a lambda sensor 1, the lambda regulation of which is carried out via a CJ135 Lambda Probe Interface IC, is diagnosed during ongoing operation. In FIG. 2, the curve of Nernst voltage Un of lambda sensor 1 is shown prior to, during, and after the diagnosis according to the present invention. A pump current pulse 21 and a pump current counter pulse 22 are generated in a diagnosis period of time via CJ135 operating mode "set pump current." These pulses are shown in FIG. 2 by the change of a dimensionless pump current activation signal 2. Initially, for a period of time T21 of 70 msec, a pump current pulse 21 having a known negative delta amplitude Δ21 to the previously adjusted state is set, which fills lambda-1 cavity 14 with an overpressure of oxygen ions. Directly thereafter, a pump current counter pulse 22 takes place, having equal duration T22 of 70 ms and a delta amplitude Δ22 in the opposite direction, which is reduced in relation to delta amplitude Δ21 of pump current pulse 21, so that at the end of pump current counter pulse 22, Nernst voltage Un is again at 450 mV and pump current 2 may immediately again be referred to as adjusted. The pump current validity is therefore restored in this exemplary embodiment of the method according to the present invention after 140 msec.

What is claimed is:

1. A method for diagnosing a lambda sensor during ongoing operation, comprising:
    energizing the lambda sensor using a pump current pulse additive to a pump current that is applied to a pump cell and a pump current counter pulse additive to the pump current, wherein one of the pump current pulse and the pump current counter pulse is applied after another one of the pump current pulse and the pump current counter pulse; and
    ascertaining a malfunction of the lambda sensor from voltages which are measured at at least one of the pump cell, and a Nernst cell, of the lambda sensor, during the energizing.

2. The method as recited in claim 1, wherein the pump current pulse and the pump current counter pulse are selected in such a way that changes of a Nernst voltage of the lambda sensor are neutralized by the pump current pulse, the pump current counter pulse, and diffusion effects and flow effects occurring between the pulses.

3. The method as recited in claim 2, wherein a delta amplitude of the pump current counter pulse is adjusted over multiple diagnosis cycles in such a way that changes of the Nernst voltage of the lambda sensor are neutralized by the pump current pulse, the pump current counter pulse, and diffusion effects and flow effects occurring between the pulses.

4. The method as recited in claim 3, wherein at least one of: i) at least one diffusion characteristic, and ii) at least one flow characteristic, of a diffusion barrier of the lambda sensor is ascertained from a ratio between a delta amplitude of the pump current pulse and a delta amplitude of the pump current counter pulse.

5. The method as recited in claim 1, wherein a duration of the pump current pulse corresponds to a duration of the pump current counter pulse.

6. The method as recited in claim 5, wherein the delta amplitude of the pump current pulse is greater than the delta amplitude of the pump current counter pulse.

7. The method as recited in claim 6, wherein the delta amplitude of the pump current counter pulse is selected as a function of at least one of: i) at least one diffusion characteristic, and ii) at least one flow characteristic, of a diffusion barrier of the lambda sensor.

8. A computer-readable storage medium storing a computer program for diagnosing a lambda sensor during ongoing operation, the computer program, when executed on a computer, causing the computer to perform:
  energizing the lambda sensor using a pump current pulse additive to a pump current that is applied to a pump cell and a pump current counter pulse additive to the pump current, wherein one of the pump current pulse and the pump current counter pulse is applied after another one of the pump current pulse and the pump current counter pulse; and
  ascertaining a malfunction of the lambda sensor from voltages which are measured at at least one of the pump cell, and a Nernst cell, of the lambda sensor, during the energizing.

9. A control unit, which is designed for diagnosing a lambda sensor during ongoing operation, the control unit configured to:
  energize the lambda sensor using a pump current pulse additive to a pump current that is applied to a pump cell and a pump current counter pulse additive to the pump current, wherein one of the pump current pulse and the pump current counter pulse is applied after another one of the pump current pulse and the pump current counter pulse; and
  ascertain a malfunction of the lambda sensor from voltages which are measured at at least one of the pump cell, and a Nernst cell, of the lambda sensor, during the energizing.

10. The method as recited in claim 1, wherein one of the pump current pulse and the pump current counter pulse is applied immediately after another one of the pump current pulse and the pump current counter pulse.

11. The computer-readable storage medium as recited in claim 8, wherein one of the pump current pulse and the pump current counter pulse is applied immediately after another one of the pump current pulse and the pump current counter pulse.

12. The control unit as recited in claim 9, wherein one of the pump current pulse and the pump current counter pulse is applied immediately after another one of the pump current pulse and the pump current counter pulse.

* * * * *